(12) United States Patent
Yuan et al.

(10) Patent No.: US 12,400,145 B2
(45) Date of Patent: Aug. 26, 2025

(54) INGESTING SCHEMA-LESS AGRICULTURAL DATA FOR MACHINE LEARNING PIPELINE(S)

(71) Applicant: Deere & Company, Moline, IL (US)

(72) Inventors: Zhiqiang Yuan, San Jose, CA (US); Yujing Qian, Mountain View, CA (US)

(73) Assignee: Deere & Company, Moline, IL (US)

( * ) Notice: Subject to any disclaimer, the term of this patent is extended or adjusted under 35 U.S.C. 154(b) by 722 days.

(21) Appl. No.: 17/715,487

(22) Filed: Apr. 7, 2022

(65) Prior Publication Data

US 2023/0325707 A1 Oct. 12, 2023

(51) Int. Cl.
*G06F 17/00* (2019.01)
*G06N 20/00* (2019.01)

(52) U.S. Cl.
CPC .................................. *G06N 20/00* (2019.01)

(58) Field of Classification Search
CPC ............................... G06N 20/00; G06N 5/025
See application file for complete search history.

(56) References Cited

U.S. PATENT DOCUMENTS

| | | | | |
|---|---|---|---|---|
| 11,185,007 | B1* | 11/2021 | Berg | G06F 18/217 |
| 11,263,707 | B2* | 3/2022 | Perry | A01B 79/005 |
| 11,599,518 | B2* | 3/2023 | Menghani | G06F 16/2282 |
| 2016/0275580 | A1* | 9/2016 | Uechi | G06Q 10/06315 |
| 2020/0334518 | A1 | 10/2020 | Guan et al. | |
| 2021/0374525 | A1* | 12/2021 | Bremer | G06F 18/214 |

OTHER PUBLICATIONS

Hao Zhang et al, Research and Application of Agriculture Knowledge Graph. In Proceedings of the 2021 5th International Conference on Electronic Information Technology and Computer Engineering. Association for Computing Machinery, 680-688, <https://doi.org/10.1145/3501409.3501531>, Oct. (Year: 2021).*

Toth et al., "Spatial information in European agricultural data management. Requirements and interoperability supported by a domain model" Elsevier. Land Use Policy 57 (2016), pp. 64-79.

Meshram et al., "Machine learning in agriculture domain: A state-of-art survey" Elsevier. Artificial Intelligence in the Life Sciences 1 (2021), 11 pages.

(Continued)

*Primary Examiner* — Greta L Robinson
(74) *Attorney, Agent, or Firm* — HANLEY, FLIGHT & ZIMMERMAN, LLC

(57) ABSTRACT

Techniques are disclosed herein that enable generating a relationship embedding indicating a relationship between one or more agricultural attributes of a table of agricultural data with one or more nodes in an agricultural knowledge graph. Various implementations include processing a table of agricultural data with rows of agricultural records and columns of agricultural attributes. Additional or alternative implementations include processing the table of agricultural data using an embedding model portion of the mapping model to generate an embedding space representation of each of the agricultural attributes. Various implementations can include selecting a node corresponding to a given agricultural attribute based on a distance between the embedding space representation of the given agricultural attribute and the embedding space representations of one or more nodes.

18 Claims, 7 Drawing Sheets

(56) References Cited

OTHER PUBLICATIONS

Zhang et al., "Knowledge Mapping of Machine Learning Approaches Applied in Agricultural Management—A Scientometric Review with CiteSpace" Sustainability 2021, 13, 7662. https://doi.org/10.3390/su13147662. 15 pages.

Gray et al., "Digital Farmer Profiles: Reimagining Smallholder Agriculture" Feed The Future. The U.S. Government's Global Hunger & Food Security Initiative. Nov. 2018. 91 pages.

Shi et al., "Constructing Crop Portraits Based on Graph Databases Is Essential to Agricultural Data Mining" Information 2021, 12, 227. https://doi.org/10.3390/info12060227. 14 pages.

Carletto, Calogero, "Better data, higher impact: improving agricultural data systems for societal change" European Review of Agricultural Economics, vol. 48 (4) (2021) pp. 719-740. doi:https://doi.org/10.1093/erae/jbab030.

Kalinowski et al., "A Survey of Embedding Space Alignment Methods for Language and Knowledge Graphs" arXiv:2010.13688v1 [cs.CL] dated Oct. 26, 2020, 27 pages.

* cited by examiner

INGESTING SCHEMA-LESS AGRICULTURAL DATA FOR MACHINE LEARNING PIPELINE(S)

BACKGROUND

As agricultural data mining and planning becomes more commonplace, the amount of data analyzed, and the number of sources providing that data, is increasing rapidly. In many cases these sources, such as individual farms, farming cooperatives ("co-ops"), and other agricultural entities such government agencies and commercial enterprises, may provide similar data, such as seeds planted per acre, seeds planted per row, seeds planted per plot, amount of fertilizer X applied each week, amount of fertilizer X applied each month, amount of fertilizer X applied each day, etc. However, a similar type of data may vary widely from source to source. Consequently, unifying/normalizing agricultural data from multiple different sources for purposes such as crop yield prediction and/or diagnoses can be complicated, and often involves significant human intervention (and hence, investment and/or costs), e.g., using manually created templates, etc.

SUMMARY

Techniques disclosed herein are directed towards processing tables of schema-less agricultural data using a mapping model to generate a relationship between agricultural attributes in the tables and nodes of an agricultural knowledge graph. In some implementations, the nodes of the knowledge graph can be used to normalize the data to a common schema associated with a machine learning pipeline.

A table of agricultural data can include rows of agricultural records and columns of agricultural attributes. For example, each agricultural record can correspond to a date data was captured at a portion of a farm (e.g., the same portion of the same farm), a distinct portion of a farm (e.g., a specific crop, a specific row of crops, a specific acer of the farm, a specific field of the farm, etc.), a distinct farm (e.g., a first farm, a second farm, etc.), one or more additional portions of agricultural data, and/or combinations thereof. Additionally or alternatively, the agricultural attributes can include descriptions of the captured data such as yield, temperature, soil content, crop name, number of leaves, number of flowers, harvest date, etc.

In some implementations, different tables can include different sets of agricultural attributes. For example, a first table can have a set of agricultural attributes including daily temperature, planting date, and harvesting date, where the daily temperature is an average temperature in degrees Celsius, the planting date is in a month/date/year format (e.g., April 7, 2022), and the harvesting date is in a month/date/year format (e.g., July 15, 2022). A second table can have a set of agricultural attributes including a planting date, a harvesting date, and a yield, where the planting date is in a day/month/year format (e.g., 7/4/2022), the harvesting date is a month/date/year format (e.g., 15/7/2022), and the yield is a harvested yield. In the illustrative example, the first table includes a daily temperature agricultural attribute which is not in the second table. Similarly, the second table includes a yield agricultural attribute which is not in the first table. Furthermore, while both the first table and the second table include a planting date attribute and a harvesting date attribute, the format of the dates are different in the first table compared to the second table (e.g., a month/day/year format in the first table and a day/month/year format in the second table).

In some implementations, an agricultural knowledge graph can capture the relationship between agricultural attributes. For example, yield can be measured in a variety of ways including an average yield, a harvested yield, a total yield, etc. In some implementations, the agricultural knowledge graph can include a yield node connected to an average yield node, a harvested yield node, a total yield node, etc. Additionally or alternatively, the nodes can capture the relationship between related types of data in the knowledge graph, such as indications of how to convert one data type to another data type. For instance, the yield node, the harvested yield node, the total yield node, one or more additional nodes, and/or combinations thereof can include an indication of how to convert the harvested yield to a total yield.

In some implementations, a table of agricultural data can be processed using the mapping model to determine a relationship between the agricultural attributes of the given table and one or more nodes of an agricultural knowledge graph. In some of those implementations, the table of agricultural data can be processed using an embedding model portion of the mapping model to generate an embedding space representation of the agricultural attributes included in the table. Similarly, an embedding space representation for the nodes of the knowledge graph can be generated based on processing the agricultural attribute corresponding to each node using the embedding model portion of the mapping model. In other words, the agricultural attributes corresponding to a given table can be projected into a shared embedding space (e.g., shared with the knowledge graph, one or more additional tables, etc.). In some implementations, the node corresponding to a given agricultural attribute can be identified based on comparing the embedding space representation of the given agricultural attribute with the embedding space representations of one or more nodes of the knowledge graph. For example, the system can determine the node corresponding to the given agricultural attribute based on the embedding space representation of a node which is closest to the embedding space representation of the given agricultural attribute.

Additionally or alternatively, the system can determine that none of the nodes in the knowledge graph correspond to a given agricultural attribute. For example, the system can determine that none of the nodes in the knowledge graph correspond to the given agricultural attribute based on determining there are no embedding space representations of any nodes within a threshold distance of the embedding space representation of the given agricultural attribute. In some of those implementations, the mapping model can add a new node to the knowledge graph based on the embedding space representation of the given agricultural attribute. For example, the embedding space representation of the new node can be the embedding space representation of the given agricultural attribute. Additionally or alternatively, the new node can be associated with one or more nodes where the embedding space representation of the one or more nodes is within an additional threshold distance of the embedding space representation of the given agricultural attribute (while not being within the threshold distance of the embedding space representation of the given agricultural attribute).

In some implementations, the system can perform one or more actions based on the relationship between the agricultural attributes and one or more nodes in the knowledge graph (i.e., based on the relationship generated based on processing the table using the mapping model). For example, the system can normalize data in the table to a common schema. Additionally or alternatively, the system can perform additional processing on the data, such as processing the normalized data using additional machine learning model(s) to perform crop yield prediction, disease diagnosis, etc.

Accordingly, various implementations set forth techniques for automatically normalizing schema-less tables of agricultural data such that the tables of data can be used in additional machine learning processes. In some implementations, a mapping model can be trained to identify one or more nodes in a knowledge graph corresponding to agricultural attributes in the table of agricultural data. Additionally or alternatively, the mapping model can be trained to automatically generate a relationship between nodes in the knowledge graph, and/or between existing nodes in the knowledge graph and a newly added node to the knowledge graph. For example, based on processing one or more tables of agricultural data, the mapping model can be used to automatically generate a new average daily temperature node as well as to determine a relationship between the daily temperature node and an existing average weekly temperature node. In contrast, conventional techniques require manually mapping each agricultural attribute to one or more additional agricultural attributes. Computing resources (e.g., processor cycles, memory, battery power, etc.) can be conserved by automatically generating an embedding relationship between nodes in a knowledge graph, thus eliminating the need to transmit data from a remote computing system to a human reviewer, for the human reviewer to generate the relationship between agricultural attributes, and to transmit the relationship from the human reviewer back to the remote computing system.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
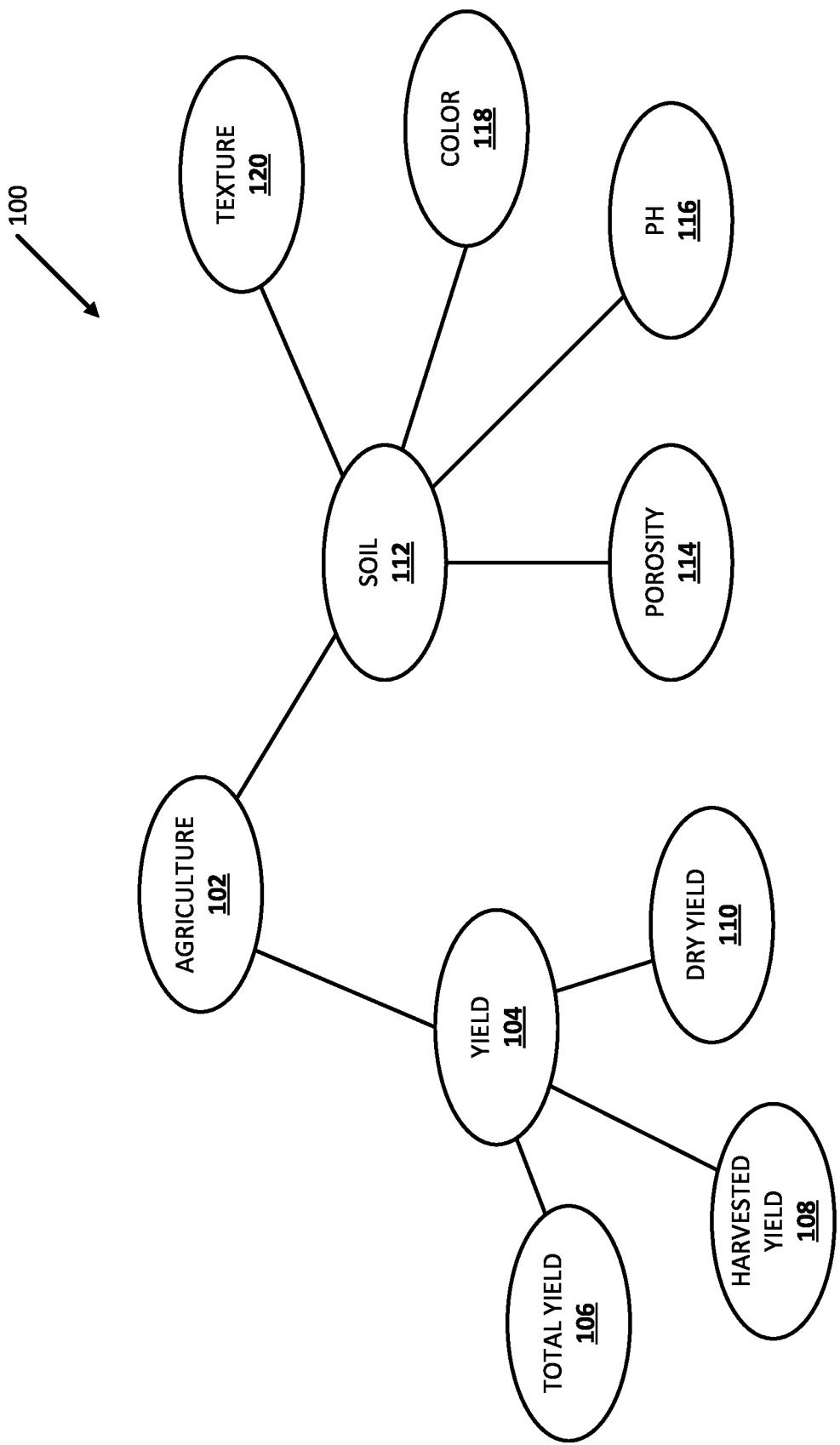
FIG. 1 illustrates an example agricultural knowledge graph in accordance with various implementations disclosed herein.

Turning now to the figures, FIG. 1 illustrates an example agricultural knowledge graph 100 in accordance with various implementations disclosed herein. The example agricultural knowledge graph 100 includes a plurality of nodes connected by a plurality of edges. For example, agricultural knowledge graph 100 includes a root agriculture node 102. A yield node 104 and a soil node 112 are connected with agricultural node 102. In the illustrated example, yield node 104 is connected to a total yield node 106, a harvested yield node 108 and a dry yield node 110. Similarly, soil node 112 is connected to porosity node 114, pH node 116, color node 118, and texture node 120. The nodes captured in agricultural knowledge graph 100 are merely illustrative. In some implementations, an agricultural knowledge graph can include one or more additional or alternative nodes, such as a temperature node, a harvesting date node, a planting date node, a date format node, a precipitation node, a crop type node, one or more additional nodes, and/or combinations thereof. Additionally or alternatively, the nodes can be connected in a variety of configurations. For example, in some other implementations, the color node 118 can be connected to yield node 104 instead of soil node 112.

In some implementations, different tables of agricultural data can capture similar data. However, the data may be in a different format. For example, a first table of agricultural data can capture a harvested yield while a second table of agricultural data can capture a dry yield. In other words, while both the first table and the second table capture yield data, the harvested yield in the first table is not immediately comparable with the dry yield of the second table. In some implementations, agricultural knowledge graph 100 captures this relationship between harvested yield and dry yield with yield node 104, harvested yield node 108, and dry yield node 110. Furthermore, the agricultural knowledge graph can include information on normalizing similar data, such as normalizing harvested yield and/or dry yield into a single yield metric. Automatically normalizing the data across multiple tables of agricultural data enables the data to be processed using a variety of one or more additional machine learning models, such as a disease prediction model, a crop growth prediction model, a weather prediction model, one or more additional agricultural prediction models, and/or combinations thereof.

Figure 2A:
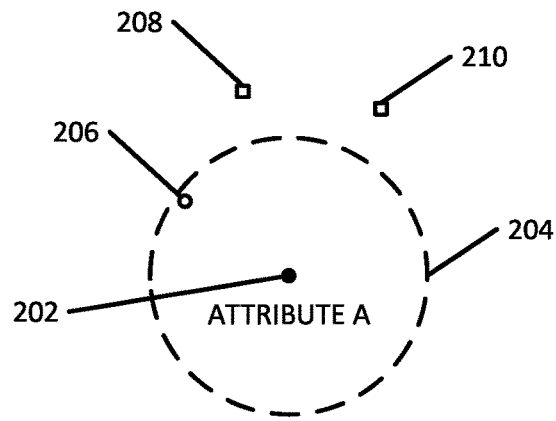
FIG. 2A, FIG. 2B, FIG. 2C, and FIG. 2D illustrate embedding space representations of agricultural attributes in accordance with various implementations disclosed herein.

FIG. 2A illustrates an embedding space representation of an example agricultural attribute 202. In some implementations, the embedding space representation of agricultural attribute A 202 can be generated based on processing agricultural attribute A using an embedding model portion of a mapping model. In the illustrated example, the embedding space can also include an embedding space representation of a first node 206 in a knowledge graph, an embedding space representation of a second node 208 in the knowledge graph, and an embedding space representation of a third node 210 in the knowledge graph. In some implementations, the agricultural knowledge graph can be in accordance with knowledge graph 100 of FIG. 1, knowledge graph 300 of FIG. 3, and/or one or more additional or alterative knowledge graphs. In some implementations, the system can determine the node corresponding to agricultural attribute A based on a distance between the embedding space representation of attribute A 202 and the embedding space representation of nodes 206, 208, and 210. For example, the system can determine whether the embedding space representation of the nodes is within a threshold distance of the embedding space representation of attribute A. FIG. 2A additionally includes an indication of a threshold distance 204 from the embedding space representation of agricultural attribute A 202. In the illustrated example, the embedding space representation of the first node 206 is within the threshold distance 204 of the embedding space representation of attribute A 202, while the embedding space representation of the second node 208 and the embedding space representation of the third node 210 are not within the threshold distance 204 of the embedding space representation of attribute A 202. In some implementations, the system can determine the first node corresponds with attribute A based on determining the embedding space representation of the first node 206 is within the threshold distance 204 of the embedding space representation of attribute A. However, the threshold distance 204 illustrated in FIG. 2A is merely illustrative. In some implementations, one or more additional or alternative threshold values can be utilized.

Figure 2B:
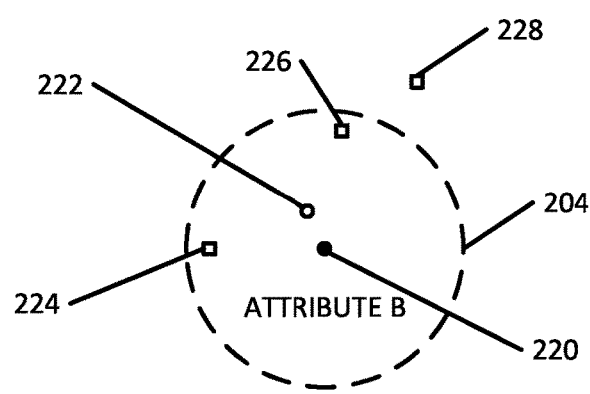

Additionally or alternatively, in some implementations the embedding space representation of several nodes can be within the threshold distance of the embedding space representation of the agricultural attribute. FIG. 2B illustrates the embedding space representation of agricultural attribute B 220 along with the embedding space representation of a fourth node 222, an embedding space representation of a fifth node 224, an embedding space representation of a sixth node 226, and an embedding space representation of a seventh node 228. In FIG. 2B, the embedding space representation of the fourth node 222, the embedding space representation of the fifth node 224, and the embedding space of the sixth node 226 are within the threshold distance 204 of the embedding space representation of attribute B 220. The embedding space representation of the seventh node 228 is not within the threshold distance 204 of the embedding space representation of attribute B 220. In some implementations, when multiple embedding space representations of nodes are within the threshold distance of the embedding space representation of the attribute, the system can select the node with the shortest corresponding distance to the attribute. For example, the embedding space representation of the fourth node 222 is the shortest distance from the embedding space representation of attribute B 222 (compared to the embedding space representation of the fifth node 224 and the embedding space representation of the sixth node 226). In some implementations, the system can select the fourth node as the corresponding node to the attribute B based on determining the embedding space representation of the fourth node 222 is the shortest distance from the embedding space representation of attribute B 222.

Figure 2C:
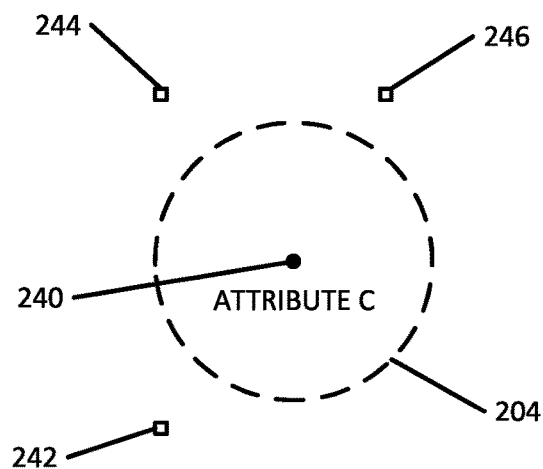
Figure 2D:
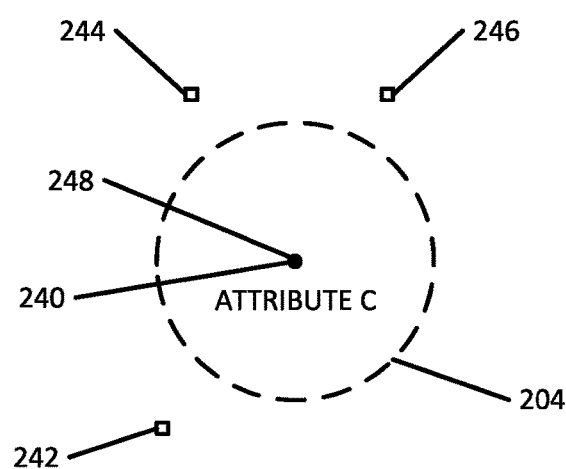

However, in some implementations, there is no node with an embedding space representation within the threshold distance to the embedding space representation of the attribute. FIG. 2C illustrates an embedding space representation of agricultural attribute C 240, the embedding space representation of an eighth node 242, the embedding space representation of a ninth node 244, and the embedding space representation of a tenth node 246. None of the embedding space representations 242, 244, or 246 are within the threshold distance 204 of the embedding space representation of attribute C 240. In some implementations, the system can determine to add a new node to the knowledge graph based on the embedding space representation of the attribute in response to determining there is no embedding space representation of a node within the threshold distance. FIG. 2D illustrates also illustrates the embedding space representation of agricultural attribute C 240, the embedding space representation of an eighth node 242, the embedding space representation of a ninth node 244, and the embedding space representation of a tenth node 246. Additionally, FIG. 2D illustrates an additional embedding space representation of a new node 248 corresponding to the embedding space representation of agricultural attribute C 240. In the illustrated example, the embedding space representation of the new node 248 is in the same location as the embedding space representation of attribute C 240. However, this is merely illustrative and in additional or alternative implementations, the system can generate a new node with a corresponding embedding space representation in one or more additional or alternative positions in the embedding space that are within the threshold distance.

Figure 3:
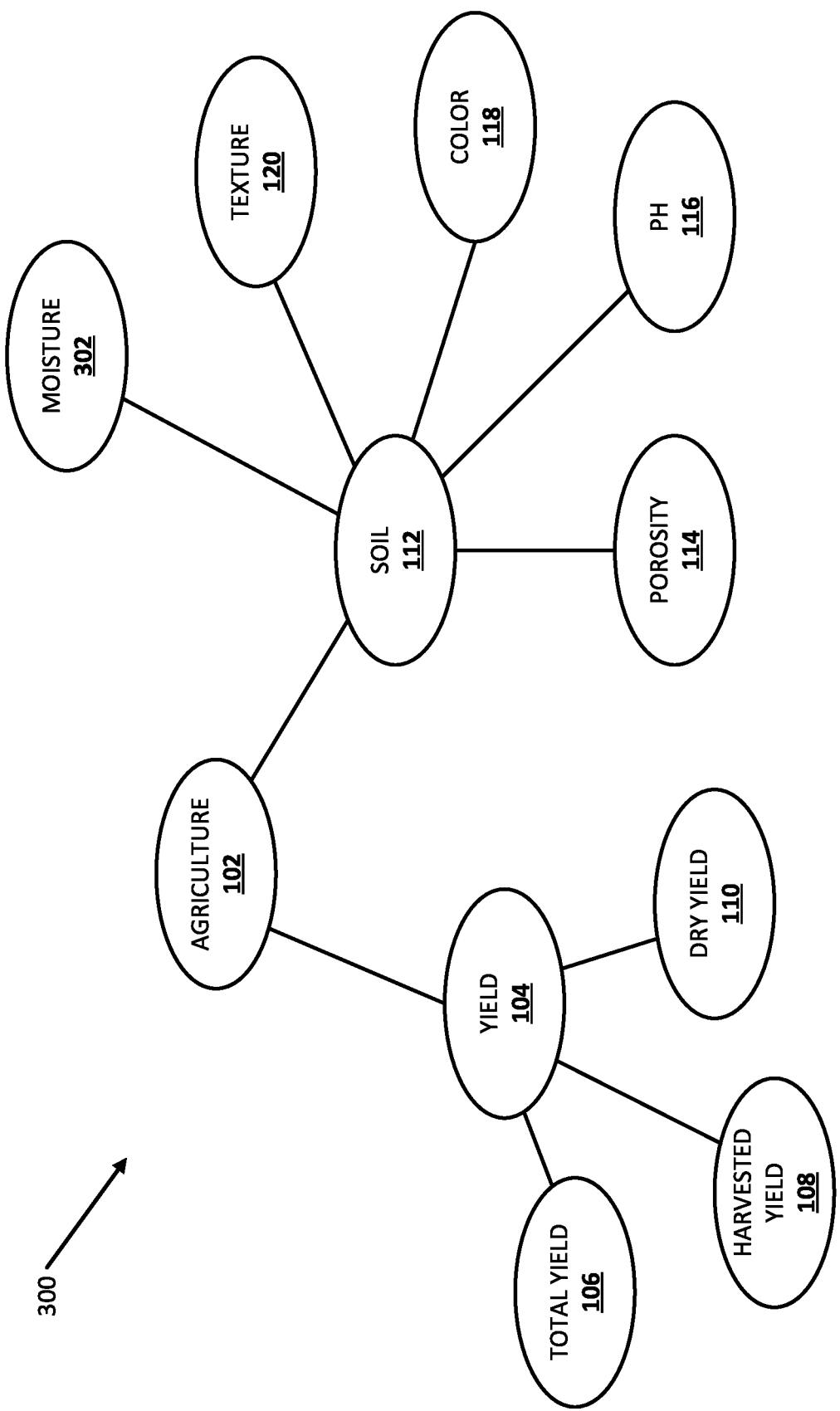
FIG. 3 indicates an additional knowledge graph in accordance with various implementations disclosed herein.

FIG. 3 illustrates an example agricultural knowledge graph 300. Knowledge graph 300 includes the nodes described in knowledge graph 100 with respect to FIG. 1 including the root agriculture node 102, the yield node 104, the total yield node 106, the harvested yield node 108, the dry yield node 110, the soil node 112, the porosity node 114, the pH node 116, the color node 118, and the texture node 120. Knowledge graph 300 additionally includes a moisture node 302 connected to the soil node 112. For example, as described above with respect to FIG. 2D, the system can determine that the embedding space representation of the moisture agricultural attribute 302 does not have any embedding space representations of any knowledge graph nodes within a threshold distance of the embedding space representation of the moisture agricultural attribute 302. In some implementations, the system can use the mapping model to generate a new moisture node 302 in the knowledge graph 300. Additionally or alternatively, the mapping model can generate a relationship between the new moisture node 302 and one or more additional nodes in the knowledge graph. For example, the mapping model can be used to generate a relationship between the moisture node 302 and the porosity node 114 based on how moisture changes porosity in soil. The relationship can be stored in the moisture node 302, the porosity node 114, the soil node 112, one or more additional nodes, and/or combination thereof.

Figure 4:
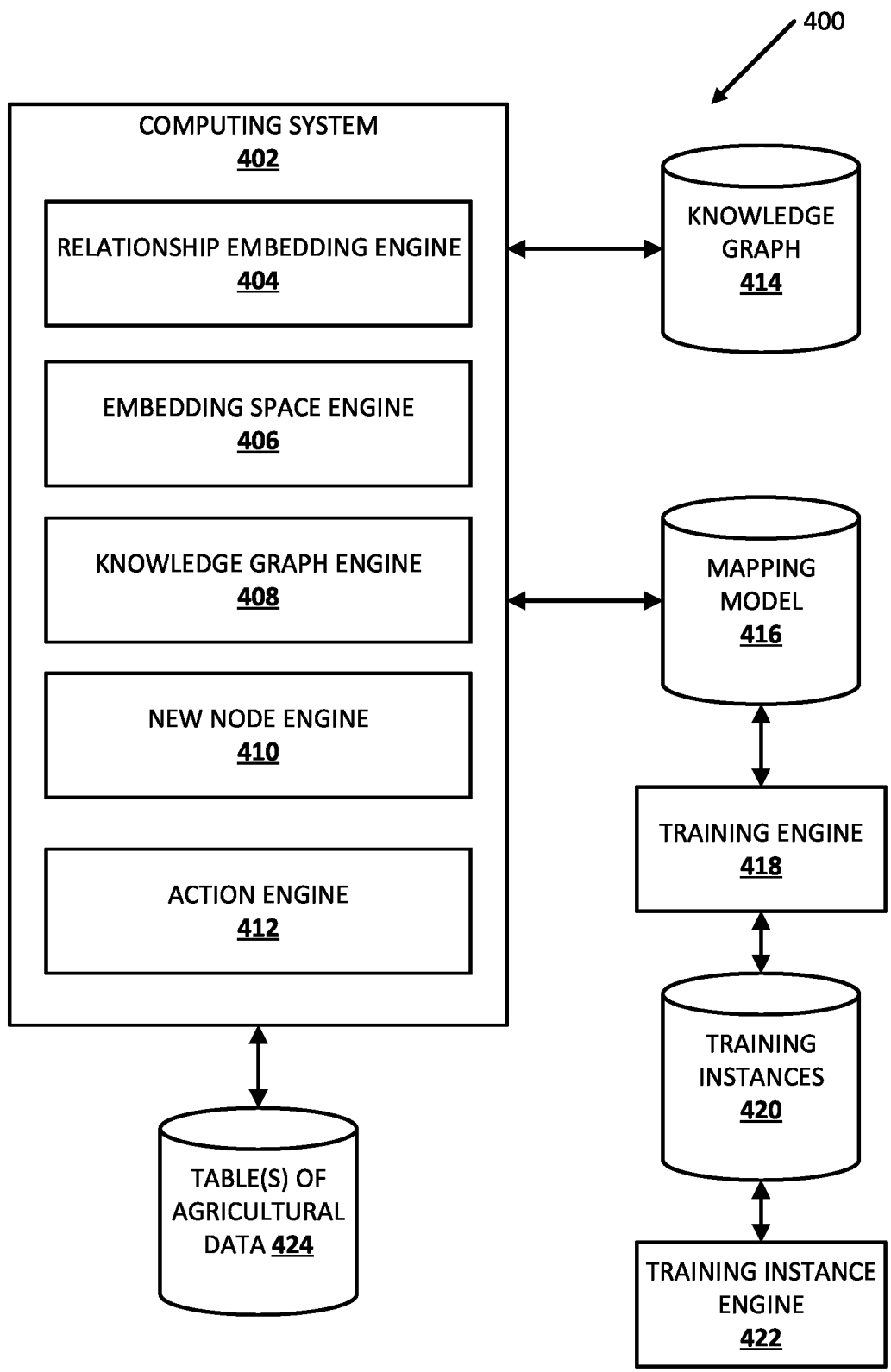
FIG. 4 illustrates an example environment in which various implementations disclosed herein may be implemented.

FIG. 4 illustrates a block diagram of an example environment 400 in which implementations disclosed herein may be implemented. The example environment 400 includes a computing system 402 which can include relationship embedding engine 404, embedding space engine 406, knowledge graph engine 408, new node engine 410, action engine 412, training engine 418, training instance engine 422, and/or one or more additional or alternative engines (not depicted). Additionally or alternatively, computing system 402 may be associated with knowledge graph 414, mapping model 416, training instances 420, one or more tables of agricultural data 424, and/or one or more additional or alternative components (not depicted).

In some implementations, computing system 402 may include may include user interface input/output devices (not depicted), which may include, for example, a physical keyboard, a touch screen (e.g., implementing a virtual keyboard or other textual input mechanisms), a microphone, a camera, a display screen, and/or speaker(s). The user interface input/output devices may be incorporated with one or more computing system 402 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of computing system 402 may be implemented on a computing system that also contains the user interface input/output devices.

Some non-limiting examples of computing system 402 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Computing system 402 may include one or more memories for storage of data and software applications, one or more processors for accessing data and executing applications, and other components that facilitate communication over a network. The operations performed by computing system 402 may be distributed across multiple computing devices. For example, computing programs running on one or more computers in one or more locations can be coupled to each other through a network.

In some implementations, the tables of agricultural data 424 can include rows of agricultural records and columns of agricultural attributes. For example, agricultural records can include a date data was captured at a portion of a farm (e.g., the same portion of the same farm on several dates), a distinct portion of a farm (e.g., a specific crop, a specific row of crops, a specific acer of the farm, a specific field of the farm, etc.), a distinct farm (e.g., a first farm, a second farm, a third farm, etc.), one or more additional groups of agricultural data, and/or combinations thereof. Additionally or alternatively, the agricultural attributes can include descriptions of the captured data such as yield, temperature, soil content, crop name, number of leaves, number of flowers, harvest date, etc.

For example, a first table of agricultural data 424 can have a set of agricultural records in a month/day/year format of February 1, 2022; April 1, 2022; and May 1, 2022; and a set of agricultural attributes of number of leaves, temperature (an average temperature in degrees Fahrenheit), and rainfall (in inches). In some implementations, the February 1, 2022 agricultural record can have a number of leaves value of 0, a temperature value of 65, and a rainfall value of 1.3; the April 1, 2022 agricultural record can have a number of leaves value of 2, a temperature value of 70, and a rainfall value of 0; and the May 1, 2022 agricultural record can have a number of laves value of 20, a temperature value of 82, and a rainfall value of 0.5.

Additionally or alternatively, a second table of agricultural data 424 can have a set of agricultural records in a day/month/year format of 1/2/2022; 1/4/2022; and 1/5/2022, and a set of agricultural attributes of number of leaves, temperature (a daily high temperature in degrees Celsius), and rainfall (a binary yes or no value). In some implementations, the 1/2/2022 agriculture record can have a number of leaves value of 0, a temperature value of 18.3, and a rainfall value of 'yes'; the 1/4/2022 agricultural record can have a number of leaves value of 2, a temperature value of 21.1, and a rainfall value of 'no'; and the 1/5/2022 agricultural record can have a number of leaves value of 20, a temperature value of 27.2, and a rainfall value of 'yes'.

While the first table of agricultural data and the second table of agricultural data represent similar information, the tables are in different formats. For example, the format of the agricultural records in the first table is in a month/day/year format (with the name of the month spelled out) and the format of the agricultural records in the second table is in a day/month/year format (with the month represented as a digit). Similarly, the rainfall agricultural attribute in the first table is represented as a numerical value in inches while the rainfall agricultural attribute in the second table is represented as a yes or no value. Additionally or alternatively, the temperature attribute in the first table is an average temperature in degrees Fahrenheit, while the temperature attribute in the second table is a high temperature in degrees Celsius.

While the examples of the first table of agricultural data and the second table of agricultural data are described herein with rows of agricultural records and columns of agricultural records, in some other implementations, the table(s) of agricultural data can include rows of agricultural attributes and columns of agricultural records. Additionally or alternatively, one or more agricultural records may not include a value corresponding to one or more of the agricultural attributes.

In some implementations, agricultural knowledge graph 414 can capture the relationship between agricultural attributes. For example, a degrees Fahrenheit node and a degrees Celsius node can both connect with a temperature node. For example, yield can be measured in a variety of ways including an average yield, a harvested yield, a total yield, etc. In some implementations, the agricultural knowledge graph can include a yield node connected to an average yield node, a harvested yield node, a total yield node, etc. Additionally or alternatively, the nodes can capture the relationship between related types of data in the knowledge graph, such as indications of how to convert one data type to another data type. For instance, the yield node, the harvested yield node, the total yield node, one or more additional nodes, and/or combinations thereof can include an indication of how to convert the harvested yield to a total yield. Example agricultural knowledge graph 100 and agricultural knowledge graph 300 are described herein with respect to FIG. 1 and FIG. 3 respectively.

In some implementations, relationship embedding engine 404 can process one or more tables of agricultural data 424 using the mapping model 416 to generate a relationship embedding indicating a relationship between the agricultural attributes of the table and one or more nodes of the knowledge graph. In some of those implementations, embedding space engine 406 can process the table of agricultural data 424 using an embedding model portion (not depicted) of the mapping model 416 to generate an embedding space representation of each of the agricultural attributes of the corresponding table. The nodes of the knowledge graph 414 can also be projected into the same embedding space by processing one or more of the nodes using the embedding model portion of the mapping model 416. Additionally or alternatively, the system can store a previously calculated embedding space representation of one or more of the nodes of the knowledge graph 416. Example embedding space representations of agricultural attributes and nodes are described herein with respect to FIGS. 2A-2D.

In some implementations, knowledge graph engine 410 can process the embedding space representation of an agricultural attribute to determine a corresponding embedding space representation of a node in the knowledge graph. In some implementations, the knowledge graph engine 410 can determine the node with the embedding space representation of the node closest to the embedding space representation of the given agricultural attribute corresponds with the given agricultural attribute. In some implementations, knowledge graph engine 410 can determine whether the embedding space representation of any nodes are within a threshold distance of the embedding space representation of a given agricultural attribute, where the embedding space representation of the node must be within the threshold distance of the embedding space representation of the given attribute for the node to correspond to the attribute. In other words, nodes will not correspond with agricultural attributes when the corresponding embedding space representations which are too far away from the embedding space representation of the agricultural attribute (i.e., more than a threshold distance away).

In some implementations, none of the embedding space representations of the nodes in the knowledge graph are within the threshold distance of the embedding space representation of the attribute. In some of those implementations, the new node engine 410 can generate a new node in the knowledge graph 414 based on the embedding space representation of the attribute (and/or the agricultural attribute itself). In some implementations, the embedding space representation of the new node can be set to equal the embedding space representation of the agricultural attribute. However, this is merely exemplary, and the embedding space representation of the new node can be set to equal one or more additional points in the embedding space that are within the threshold distance of the embedding space representation of the attribute. In some implementations, an updated knowledge graph 414 can be stored, where the updated knowledge graph includes the new node.

In some implementations, the action engine 412 can cause the computing system 02 and/or an additional computing system (not depicted) to perform one or more actions. For example, the action engine 412 can normalize one or more values in a table of agricultural data such that the table of agricultural data can be fed into a further machine learning pipeline such as yield prediction, disease prediction, one or more additional agricultural predictions and/or combinations thereof.

In some implementations, training instance engine 422 can be used to generate training instances 420. For example, a training instance can include a table of agricultural data, such as a table of agricultural data with rows of agricultural records and columns of agricultural attributes. In some implementations, one or more of the agricultural attributes can be explicitly labeled in the table of agricultural data. In some other implementations, one or more of the agricultural attributes in the table are not explicitly labeled. Additionally or alternatively, the training instance can include a list of the agricultural attributes in the corresponding table and/or a relationship embedding indicating a relationship between one or more of the agricultural attributes and one or more nodes in a knowledge graph.

Additionally or alternatively, a training instance can include multiple tables of agricultural data. In some implementations, each table of agricultural data in the training instance can include a set of the same agricultural attributes. In some other implementations, one or more agricultural attributes in a given table can differ from one or more agricultural attributes in an additional table. For example, a temperature agricultural attribute in a first table can be in degrees Fahrenheit while a temperature agricultural attribute in a second table can be in degrees Celsius. As a further example, a third table may not include a temperature attribute while the first table and the second table include a temperature attribute. In some implementations, in addition to the multiple tables of agricultural data, the training instance can include a list of agricultural attributes in each of the tables and/or a relationship embedding indicating the relationship of each of the tables with the knowledge graph.

In some implementations, the training instance engine 422 can automatically generate one or more training instances 420. In some implementations, the training instance engine 422 can generate one or more training instances 420 based in part on annotations of the agricultural attribute(s) manually provided by a human.

In some implementations, training engine 418 can use training instances 420 to train mapping model 416. For example, training engine 418 can select a training instance (e.g., an unprocessed training instance) and process one or more agricultural tables of the selected training instance using the mapping model to generate output. In some implementations, training engine 418 can update one or more portions of the mapping model 416 based on comparing the generated output with the relationship embedding(s) of the training instance.

Figure 5:
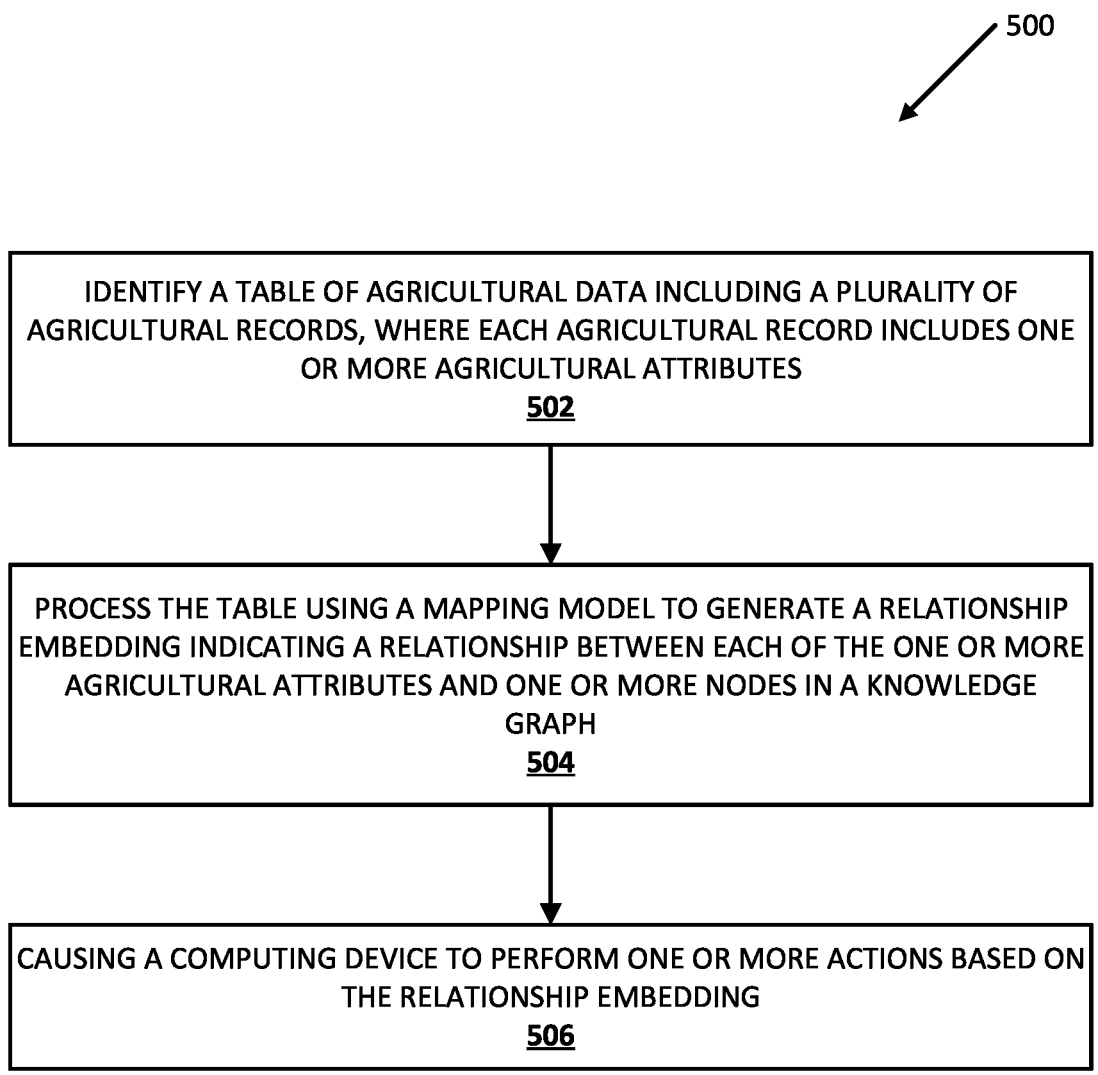
FIG. 5 is a flowchart illustrating an example process of processing a table of agricultural data using a mapping model in accordance with various implementations disclosed herein.

FIG. 5 is a flowchart illustrating an example process 500 of processing a table of agricultural data using a mapping model to generate a relationship embedding in accordance with implementations disclosed herein. For convenience, the operations of the flowchart are described with reference to a system that performs the operations. This system may include various components of various computer systems, such as one or more components of computing system 402, and/or computing system 710. Moreover, while operations of process 500 are shown in a particular order, this is not meant to be limiting. One or more operations may be reordered, omitted, and/or added.

At block 502, the system identifies a table of agricultural data. In some implementations, the table includes a plurality of agricultural records includes one or more agricultural attributes. For example, each row of a table can correspond to an agricultural record, and each column of a table can correspond to an agricultural attribute. In some implementations, each agricultural record can have data corresponding to each of the agricultural attributes. In some other implementations, one or more of the agricultural attributes may only have data corresponding to some of the agricultural attributes. In some implementations, the system can identify one or more tables of agricultural data 424 as described herein with respect to FIG. 4.

At block 504, the system processes the table using a mapping model to generate a relationship embedding indicating a relationship between each of the one or more agricultural attributes and one or more nodes in an agricultural knowledge graph. In some implementations, the system can generate the relationship embedding using relationship embedding engine 404 described with respect to FIG. 4 herein.

At block 506, the system can cause a computing device to perform one or more actions based on the relationship embedding. For example, the system can normalize one or more values in the identified table of agricultural data. In some implementations, the system can cause the normalized agricultural data to be further processed using one or more additional machine learning models (e.g., yield prediction, disease identification, etc.). In some implementations, the system can cause the computing device to perform one or more actions in accordance with action engine 412 described with respect to FIG. 4 herein.

Figure 6:
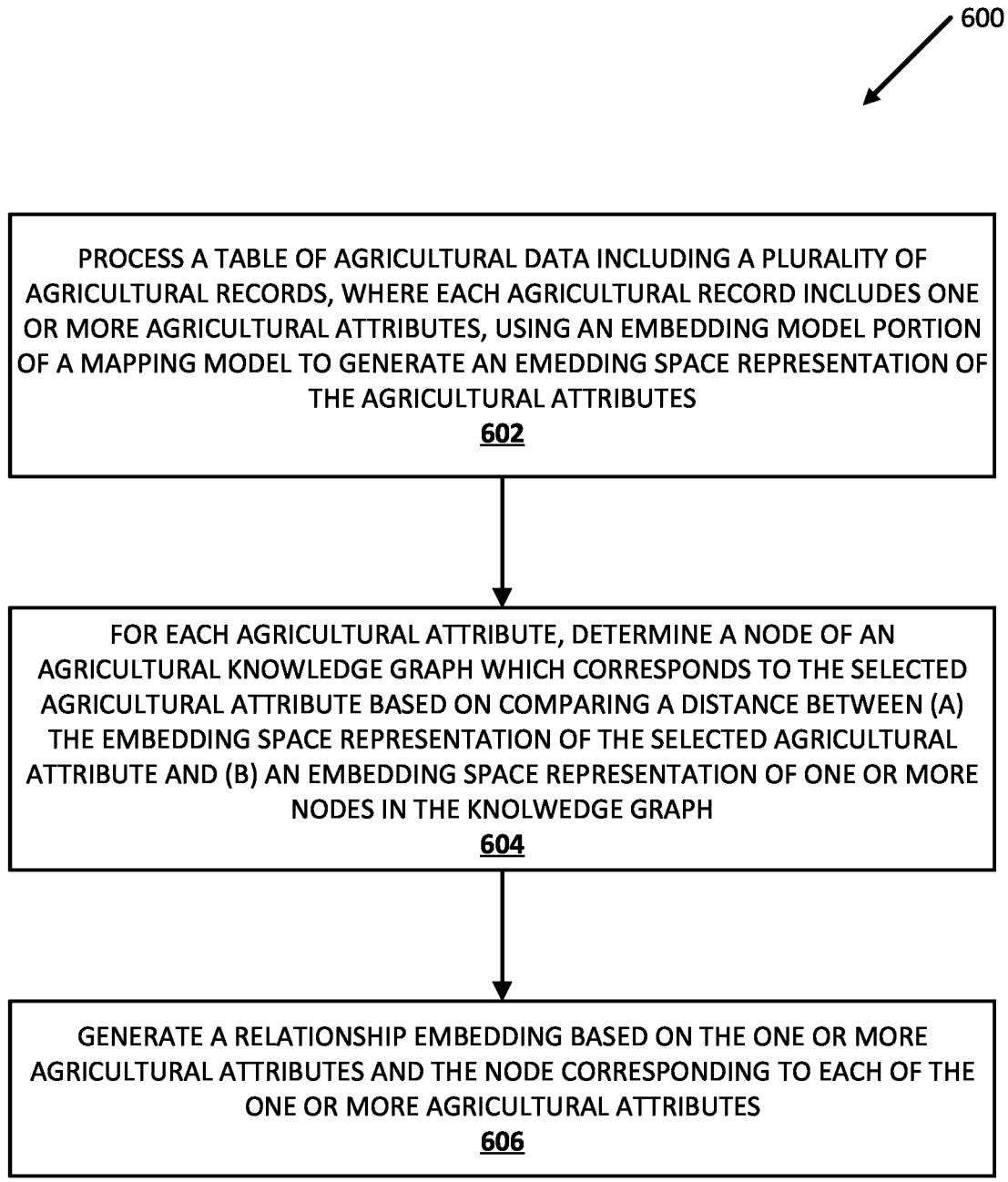
FIG. 6 is a flowchart illustrating an example process of generating a relationship embedding in accordance with various implementations disclosed herein.

FIG. 6 is a flowchart illustrating an example process 600 of generating a relationship embedding based on an embedding space representation of one or more agricultural attributes of a table of agricultural data and an embedding space representation of one or more nodes of an agricultural knowledge graph in accordance with implementations disclosed herein. For convenience, the operations of the flowchart are described with reference to a system that performs the operations. This system may include various components of various computer systems, such as one or more components of computing system 402, and/or computing system 710. Moreover, while operations of process 600 are shown in a particular order, this is not meant to be limiting. One or more operations may be reordered, omitted, and/or added.

At block 602, the system processes a table of agricultural data using an embedding model portion of a mapping model to generate an embedding space representation of one or more agricultural attributes of the table. In some implementations, the system can generate an embedding space representation of the agricultural attributes of a table of agricultural data in accordance with embedding space engine 406 described herein with respect to FIG. 4.

At block 604, for each agricultural attribute, the system determines a node of an agricultural knowledge graph which corresponds to the selected agricultural attribute. In some implementations, the system determines the node of the agricultural knowledge graph which corresponds to the selected agricultural attribute based on comparing a distance between (a) the embedding space representation of the agricultural attribute and (b) an embedding space representation of one or more nodes of the agricultural knowledge graph. In some implementations, the system can determine whether any of the embedding space representations of the nodes are within a threshold distance of the embedding space representation of the attribute. In some of those implementations, the embedding space of one node can be within the threshold distance of the embedding space representation of the attribute, and the system can select that node as corresponding to the attribute. In some other implementations, the embedding space representations of multiple nodes can be within the threshold distance of the embedding space representation of the attribute, and the system can select the node with the shortest corresponding distance between the embedding space representation of the node and the embedding space representation of the attribute. In some implementations, the system can generate the embedding space representation of the attribute(s) and/or the node(s) of the knowledge graph using embedding space engine 406 described herein with respect to FIG. 4. Additionally or alternatively, the system can select a node corresponding to an attribute (e.g., select based on the distance between the embedding space representation of the node and the embedding space representation of the attribute) using knowledge graph engine 408 described herein with respect to FIG. 4.

In some implementations, the system can determine there are no nodes with a corresponding embedding space representation that is within the threshold distance of the embedding space representation of the attribute. In some of those implementations, the system can generate a new node in the knowledge graph based on the embedding space representation of the attribute. Furthermore, in some implementations, the system can generate the new node in accordance with new node engine 410 described herein with respect to FIG. 4.

At block 606, the system generates a relationship embedding based on the one or more agricultural attributes and the node corresponding to each of the one or more agricultural attributes. In some implementations, the system can generate the relationship embedding using relationship embedding engine 404 described herein with respect to FIG. 4.

Figure 7:
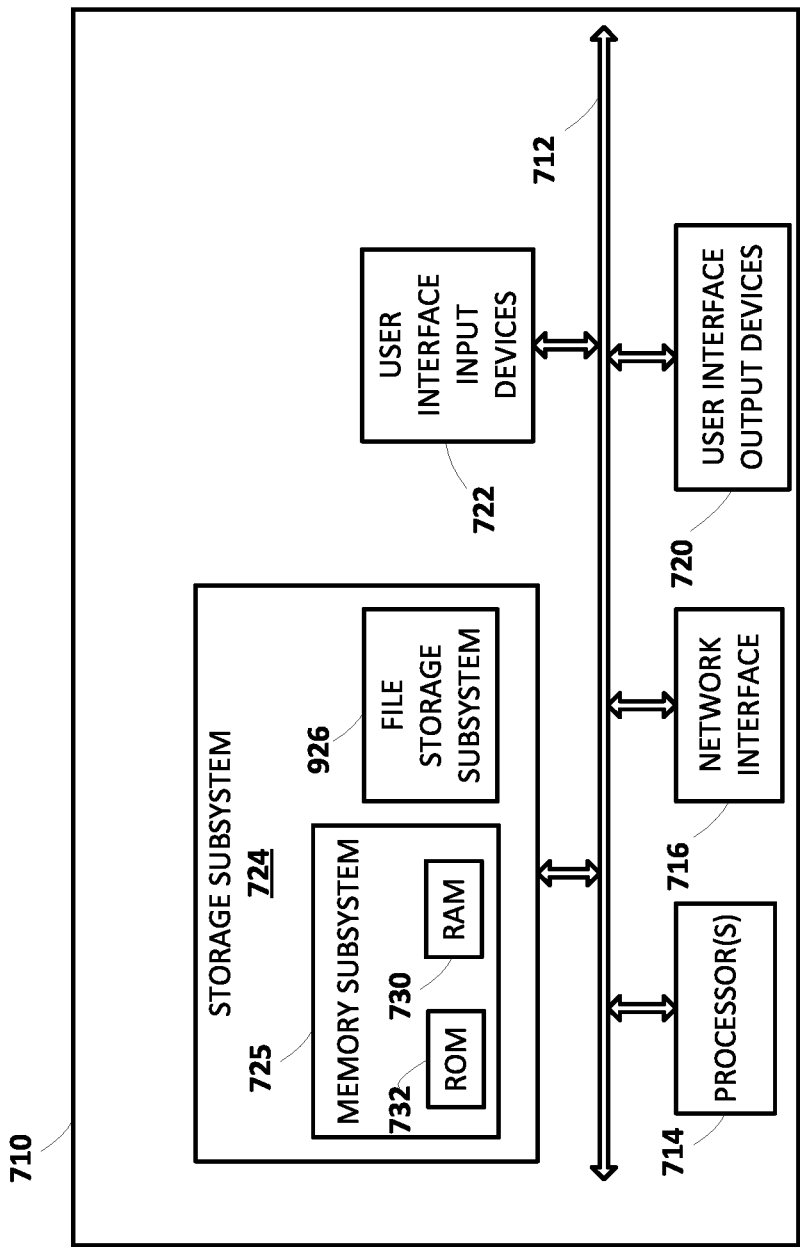
FIG. 7 illustrates an example architecture of a computing device.

FIG. 7 is a block diagram of an example computing device 710 that may optionally be utilized to perform one or more aspects of techniques described herein. In some implementations, one or more of a client computing device, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more of the processes of FIG. 5 and/or FIG. 6, as well as to implement various components depicted in FIG. 4.

These software modules are generally executed by processor 714 alone or in combination with other processors. Memory 725 used in the storage subsystem 724 can include a number of memories including a main random access memory ("RAM") 730 for storage of instructions and data during program execution and a read only memory ("ROM") 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method includes identifying a table of agricultural data, where the table includes a plurality of agricultural records, and where each agricultural record includes one or more agricultural attributes. In some implementations, the method further includes processing the table using a mapping machine learning model to generate a relationship embedding indicating a relationship between each of the one or more agricultural attributes and one or more nodes in a knowledge graph, where each node indicates a mapping agricultural attribute, where each node is connected with one or more additional nodes in the knowledge graph, and where the connection between each node and the one or more additional nodes representations a relationship between the node and the one or more additional nodes. In some implementations, the method further includes causing a computing device to perform one or more actions based on the relationship embedding, wherein causing the computing device to perform the one or more actions based on the relationship embedding comprises, generating a normalized table of agricultural data based on the table of agricultural data and the relationship embedding, and processing the normalized table of agricultural data using an additional machine learning model to generate one or more agricultural predictions.

These and other implementations of the technology disclosed herein can include one or more of the following features.

In some implementations, the method further includes identifying an additional table of agricultural data, wherein the additional table includes a plurality of additional agricultural records, wherein each additional agricultural record corresponds to one or more additional agricultural attributes, and wherein at least one of the additional agricultural attributes is distinct from the one or more agricultural attributes. In some implementations, the method further includes processing the additional table using the mapping machine learning model to generate an additional relationship embedding indicating an additional relationship between each of the one or more additional agricultural attributes and the plurality of nodes of the knowledge graph. In some implementations, the method further includes causing the computing device to perform one or more additional actions based on the additional relationship embedding. In some versions of those implementations, one of the agricultural attributes includes a dry yield, one of the additional agricultural attributes includes a harvested yield, and the dry yield node is connected with the harvested yield node via one or more edges of the knowledge graph.

In some implementations, processing the table using the mapping machine learning model to generate the relationship embedding includes processing the table using an embedding model portion of the mapping machine learning model to generate an embedding space representation of the one or more agricultural attributes. In some implementations, the method further includes identifying one or more nodes of the knowledge graph corresponding to each of the one or more agricultural attributes based on a distance between the embedding space representation of the corresponding attribute and an embedding space representation of each of the nodes. In some implementations, the method further includes generating the relationship embedding based on the one or more nodes of the knowledge graph corresponding to each of the one or more agricultural attributes. In some versions of those implementations, identifying the one or more nodes of the knowledge graph that correspond to each of the agricultural attributes based on the distance between the embedding space representation of the corresponding attribute and an embedding space representation of each of the nodes includes determining whether the distance between the embedding space representation of the corresponding attribute and the embedding space representation of each of the nodes satisfies a threshold value. In some implementations, in response to determining the distance between the embedding space representation of the corresponding attribute and the distance between the embedding space representation of each of the nodes satisfies the threshold value, the method further includes identifying the one or more nodes of the knowledge graph that correspond to the agricultural attribute based on the node with the shortest distance to the embedding space representation of the agricultural attribute. In some versions of those implementations, identifying the one or more nodes of the knowledge graph that correspond to each of the agricultural attributes based on the distance between the embedding space representation of the corresponding attribute and an embedding space representation of each of the nodes includes determining whether the distance between the embedding space representation of the corresponding attribute and the embedding space representation of each of the nodes fails to satisfy a threshold value. In some implementations, in response to determining the distance between the embedding space representation of the corresponding attribute and the embedding space representation of each of the nodes fails to satisfy the threshold value, the method further includes generating an additional node based on the embedding space representation of the attribute, where the additional node corresponds to the agricultural attribute.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
   identifying a table of agricultural data, where the table of agricultural data includes a plurality of agricultural records, and where each agricultural record includes one or more agricultural attributes;
   processing the table of agricultural data using a mapping machine learning model to generate a relationship embedding indicating a relationship between each of the one or more agricultural attributes and one or more nodes in a knowledge graph, where each node indicates a mapping agricultural attribute, where each node is connected with one or more additional nodes in the knowledge graph, and where the connection between each node and the one or more additional nodes represents a relationship between the node and the one or more additional nodes; and
   causing a computing device to perform one or more actions based on the relationship embedding, wherein causing the computing device to perform the one or more actions based on the relationship embedding includes:
      generating a normalized table of agricultural data based on the table of agricultural data and the relationship embedding; and
      processing the normalized table of agricultural data using an additional machine learning model to generate one or more agricultural predictions.

2. The method of claim 1, further including:
   identifying an additional table of agricultural data, wherein the additional table of agricultural data includes a plurality of additional agricultural records, wherein each additional agricultural record corresponds to one or more additional agricultural attributes, and wherein at least one of the one or more additional agricultural attributes is distinct from the one or more agricultural attributes;
   processing the additional table of agricultural data using the mapping machine learning model to generate an additional relationship embedding indicating an additional relationship between each of the one or more additional agricultural attributes and a plurality of nodes of the knowledge graph; and
   causing the computing device to perform one or more additional actions based on the additional relationship embedding.

3. The method of claim 2, wherein one of the one or more agricultural attributes includes a dry yield, wherein one of the one or more additional agricultural attributes includes a harvested yield, wherein a dry yield node is connected with a harvested yield node via one or more edges of the knowledge graph.

4. The method of claim 1, wherein processing the table of agricultural data using the mapping machine learning model to generate the relationship embedding includes:
   processing the table of agricultural data using an embedding model portion of the mapping machine learning model to generate an embedding space representation of the one or more agricultural attributes;
   identifying one or more nodes of the knowledge graph corresponding to each of the one or more agricultural attributes based on a distance between the embedding space representation of a corresponding agricultural attribute and an embedding space representation of each of the one or more nodes; and
   generating the relationship embedding based on the one or more nodes of the knowledge graph corresponding to each of the one or more agricultural attributes.

5. The method of claim 4, wherein identifying the one or more nodes of the knowledge graph corresponding to each of the one or more agricultural attributes based on the distance between the embedding space representation of the corresponding agricultural attribute and the embedding space representation of each of the one or more nodes includes:
   determining whether the distance between the embedding space representation of the corresponding agricultural attribute and the embedding space representation of each of the one or more nodes satisfies a threshold value; and
   in response to determining the distance between the embedding space representation of the corresponding agricultural attribute and the distance between the embedding space representation of each of the one or more nodes satisfies the threshold value, identifying the one or more nodes of the knowledge graph that correspond to the one or more agricultural attributes based on a node with the shortest distance to the embedding space representation of the corresponding agricultural attribute.

6. The method of claim 4, wherein identifying the one or more nodes of the knowledge graph corresponding to each of the one or more agricultural attributes based on the distance between the embedding space representation of the corresponding agricultural attribute and the embedding space representation of each of the one or more nodes includes:
   determining whether the distance between the embedding space representation of the corresponding agricultural attribute and the embedding space representation of each of the one or more nodes fails to satisfy a threshold value; and
   in response to determining the distance between the embedding space representation of the corresponding agricultural attribute and the embedding space representation of each of the one or more nodes fails to satisfy the threshold value, generating an additional node based on the embedding space representation of the corresponding agricultural attribute, where the additional node corresponds to the corresponding agricultural attribute.

7. A computer program comprising instructions that when executed by one or more processors of a computing system, cause the computing system to perform a method of:
   identifying a table of agricultural data, where the table of agricultural data includes a plurality of agricultural records, and where each agricultural record includes one or more agricultural attributes;
   processing the table of agricultural data using a mapping machine learning model to generate a relationship embedding indicating a relationship between each of the one or more agricultural attributes and one or more nodes in a knowledge graph, where each node indicates a mapping agricultural attribute, where each node is connected with one or more additional nodes in the knowledge graph, and where the connection between each node and the one or more additional nodes represents a relationship between the node and the one or more additional nodes; and causing a computing device to perform one or more actions based on the relationship embedding, wherein causing the computing device to perform the one or more actions based on the relationship embedding includes:

generating a normalized table of agricultural data based on the table of agricultural data and the relationship embedding; and processing the normalized table of agricultural data using an additional machine learning model to generate one or more agricultural predictions.

8. The computer program of claim 7, wherein the instructions further include:

identifying an additional table of agricultural data, wherein the additional table of agricultural data includes a plurality of additional agricultural records, wherein each additional agricultural record corresponds to one or more additional agricultural attributes, and wherein at least one of the one or more additional agricultural attributes is distinct from the one or more agricultural attributes;

processing the additional table of agricultural data using the mapping machine learning model to generate an additional relationship embedding indicating an additional relationship between each of the one or more additional agricultural attributes and a plurality of nodes of the knowledge graph; and causing the computing device to perform one or more additional actions based on the additional relationship embedding.

9. The computer program of claim 8, wherein one of the one or more agricultural attributes includes a dry yield, wherein one of the one or more additional agricultural attributes includes a harvested yield, wherein a dry yield node is connected with a harvested yield node via one or more edges of the knowledge graph.

10. The computer program of claim 7, wherein processing the table of agricultural data using the mapping machine learning model to generate the relationship embedding includes:

processing the table of agricultural data using an embedding model portion of the mapping machine learning model to generate an embedding space representation of the one or more agricultural attributes;

identifying one or more nodes of the knowledge graph corresponding to each of the one or more agricultural attributes based on a distance between the embedding space representation of a corresponding agricultural attribute and an embedding space representation of each of the one or more nodes; and generating the relationship embedding based on the one or more nodes of the knowledge graph corresponding to each of the one or more agricultural attributes.

11. The method of claim 10, wherein identifying the one or more nodes of the knowledge graph corresponding to each of the one or more agricultural attributes based on the distance between the embedding space representation of the corresponding agricultural attribute and the embedding space representation of each of the one or more nodes includes:

determining whether the distance between the embedding space representation of the corresponding agricultural attribute and the embedding space representation of each of the one or more nodes satisfies a threshold value; and in response to determining the distance between the embedding space representation of the corresponding agricultural attribute and the distance between the embedding space representation of each of the one or more nodes satisfies the threshold value, identifying the one or more nodes of the knowledge graph that correspond to the one or more agricultural attributes based on a node with the shortest distance to the embedding space representation of the corresponding agricultural attribute.

12. The method of claim 10, wherein identifying the one or more nodes of the knowledge graph corresponding to each of the one or more agricultural attributes based on the distance between the embedding space representation of the corresponding agricultural attribute and the embedding space representation of each of the one or more nodes includes:

determining whether the distance between the embedding space representation of the corresponding agricultural attribute and the embedding space representation of each of the one or more nodes fails to satisfy a threshold value; and in response to determining the distance between the embedding space representation of the corresponding agricultural attribute and the embedding space representation of each of the one or more nodes fails to satisfy the threshold value, generating an additional node based on the embedding space representation of the corresponding agricultural attribute, where the additional node corresponds to the corresponding agricultural attribute.

13. A non-transitory computer-readable storage medium storing instructions executable by one or more processors of a computing system to perform a method of:

identifying a table of agricultural data, where the table of agricultural data includes a plurality of agricultural records, and where each agricultural record includes one or more agricultural attributes;

processing the table of agricultural data using a mapping machine learning model to generate a relationship embedding indicating a relationship between each of the one or more agricultural attributes and one or more nodes in a knowledge graph, where each node indicates a mapping agricultural attribute, where each node is connected with one or more additional nodes in the knowledge graph, and where the connection between each node and the one or more additional nodes represents a relationship between the node and the one or more additional nodes; and causing a computing device to perform one or more actions based on the relationship embedding, wherein causing the computing device to perform the one or more actions based on the relationship embedding includes:

generating a normalized table of agricultural data based on the table of agricultural data and the relationship embedding; and processing the normalized table of agricultural data using an additional machine learning model to generate one or more agricultural predictions.

14. The non-transitory computer readable medium of claim 13, wherein the instructions further include:

identifying an additional table of agricultural data, wherein the additional table of agricultural data includes a plurality of additional agricultural records, wherein each additional agricultural record corresponds to one or more additional agricultural attributes, and wherein at least one of the one or more additional agricultural attributes is distinct from the one or more agricultural attributes;

processing the additional table of agricultural data using the mapping machine learning model to generate an additional relationship embedding indicating an additional relationship between each of the one or more additional agricultural attributes and a plurality of nodes of the knowledge graph; and causing the computing device to perform one or more additional actions based on the additional relationship embedding.

15. The non-transitory computer readable medium of claim 14, wherein one of the one or more agricultural attributes includes a dry yield, wherein one of the one or more additional agricultural attributes includes a harvested yield, wherein a dry yield node is connected with a harvested yield node via one or more edges of the knowledge graph.

16. The non-transitory computer readable medium of claim 13, wherein processing the table of agricultural data using the mapping machine learning model to generate the relationship embedding includes:

processing the table of agricultural data using an embedding model portion of the mapping machine learning model to generate an embedding space representation of the one or more agricultural attributes;

identifying one or more nodes of the knowledge graph corresponding to each of the one or more agricultural attributes based on a distance between the embedding space representation of a corresponding agricultural attribute and an embedding space representation of each of the one or more nodes; and generating the relationship embedding based on the one or more nodes of the knowledge graph corresponding to each of the one or more agricultural attributes.

17. The non-transitory computer readable medium of claim 16, wherein identifying the one or more nodes of the knowledge graph corresponding to each of the one or more agricultural attributes based on the distance between the embedding space representation of the corresponding agricultural attribute and the embedding space representation of each of the one or more nodes includes:

determining whether the distance between the embedding space representation of the corresponding agricultural attribute and the embedding space representation of each of the one or more nodes satisfies a threshold value; and in response to determining the distance between the embedding space representation of the corresponding agricultural attribute and the distance between the embedding space representation of each of the one or more nodes satisfies the threshold value, identifying the one or more nodes of the knowledge graph that correspond to the agricultural attribute based on a node with the shortest distance to the embedding space representation of the corresponding agricultural attribute.

18. The non-transitory computer readable medium of claim 16, wherein identifying the one or more nodes of the knowledge graph corresponding to each of the one or more agricultural attributes based on the distance between the embedding space representation of the corresponding agricultural attribute and the embedding space representation of each of the one or more nodes includes:

determining whether the distance between the embedding space representation of the corresponding agricultural attribute and the embedding space representation of each of the one or more nodes fails to satisfy a threshold value; and in response to determining the distance between the embedding space representation of the corresponding agricultural attribute and the embedding space representation of each of the one or more nodes fails to satisfy the threshold value, generating an additional node based on the embedding space representation of the corresponding agricultural attribute, where the additional node corresponds to the corresponding agricultural attribute.

* * * * *